May 29, 1962 J. E. SCHRINER ETAL 3,037,150
GROUNDED FLOATING MOUNTING RING
Filed Jan. 8, 1959

INVENTOR.
JOHN E. SCHRINER
WILLIAM M. DICE JR.
BY
Oberlin, Maky, & Donnelly
ATTORNEYS

United States Patent Office 3,037,150
Patented May 29, 1962

3,037,150
GROUNDED FLOATING MOUNTING RING
John E. Schriner and William M. Dice, Jr., Willoughby, Ohio, assignors to The Eagle-Picher Company, Cincinnati, Ohio, a corporation of Ohio
Filed Jan. 8, 1959, Ser. No. 785,698
1 Claim. (Cl. 317—2)

Our invention relates to a mounting ring for resiliently supporting dynamo-electric machines and the like and more particularly to a vibration damping mounting for such machines which includes a connection for conducting charges of electricity and preventing accumulation thereof by the machine or the like.

In application of fractional horsepower motors, usually in appliances or machines, people, such as the operator or a repairman, who come in contact with these appliances or machines, may suffer electrical shock resulting from an insulation breakdown or malfunction of the electrical circuit. For this reason, a grounding device for the motor is provided to establish a low resistant electrical conductive path from the motor frame to the machine or supporting frame which must in turn be grounded. This grounding device for the motor will also effectively dissipate any static electricity generated by the motor which in certain applications may present a fire hazard. Such positive grounding will further enhance fire protection by insuring instant operation of a fuse in the circuit.

In the past, some mounts have been constructed in an effort to solve this problem by attaching a ground connection, usually a wire between the metal parts of the mount, and then molding these parts in rubber or some other suitable resilient material. This has not proven very satisfactory since the molding process frequently resulted in a breakage of the wire or a disassociation thereof from the metal parts.

Accordingly, it is a principal object of our invention to provide grounded mounting rings that will insure a complete and permanent electrical bond between the metal parts thereof.

It is a further object of our invention to provide a mounting ring that will effectively dampen the torsional and external vibrations of the motor even with an electrical bond firmly secured to the metal parts thereof.

Other objects of the invention will appear as the description proceeds.

To the accomplishment of the foregoing and related ends, said invention, then, comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

Figure 1:
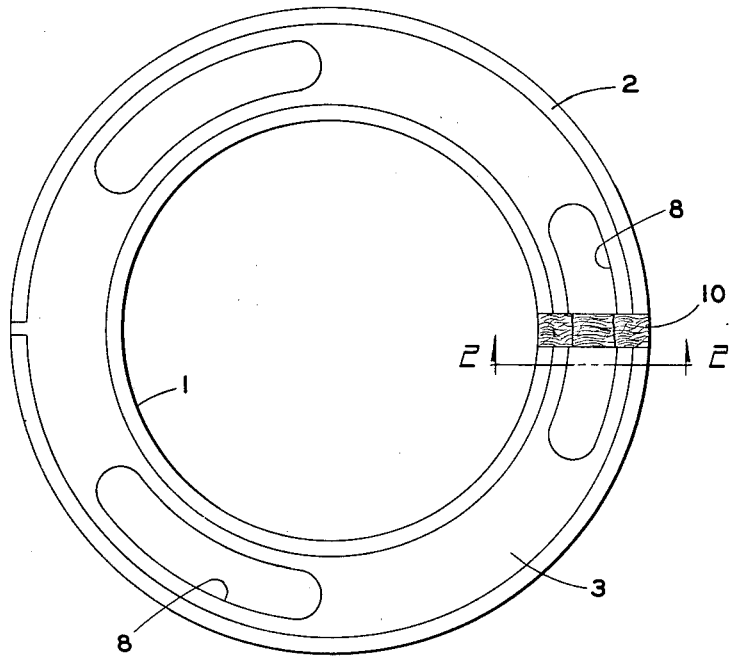
FIG. 1 is an end view of our grounded mounting ring.
Figure 2:
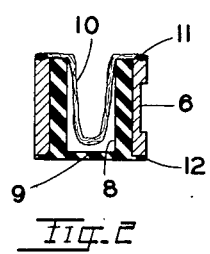
FIG. 2 is a partial sectional view of the ring taken on the line 2—2 of FIG. 1.
Figure 3:
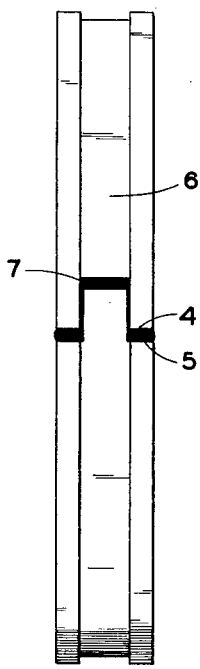
FIG. 3 is an edge view of the ring as seen from the left in FIG. 1.

Referring now to the drawing and more particularly to FIG. 1, there is illustrated one embodiment of our mounting ring which is shown as comprising two concentric metallic rings or bands 1 and 2 separated by an annulus or ring 3 of resilient material, preferably rubber. It will be understood that although rubber or synthetic rubber is preferred, the annulus 3 may be made of any suitable thermosetting or thermoplastic material as, for example, neoprene, Geon, or any of the well known foamed plastic materials of proper resilient characteristics. The inner ring 1 is a continuous metallic band providing a rigid inner surface which is adapted to be forced over a hub or the like in which the rotating shaft of the machine or motor is journaled. The outer ring 2 is a discontinuous metallic supporting band having spaced ends 4 and 5 and an outer circumferential groove 6, as shown in FIGS. 2 and 3. These rings are preferably made of steel, although any suitable metal, such as brass, bronze or aluminum for example, may be employed.

It will thus be seen that the outer ring is adapted to be gripped by a clamp or the like engaging in the circumferential groove 6 to secure the motor or other electrical device through the mounting to a supporting base. When the outer ring is thus gripped by such a clamp, the ends 4 and 5 of band 2 are compressed toward one another. This compression of the ends 4 and 5 puts the flexible annulus 3 under compression making it relatively more rigid and hence more able to resist transverse forces such as belt pull. Moreover, this clamping action of the outer ring provides an effective means for maintaining the rings 1 and 2 and the annulus 3 in proper relative position which is not affected by eventual decay of the material of annulus 3. Although this discontinuous form of the outer ring is preferred, it will be understood that a continuous ring with notches or steps for position locking may be employed. This type of ring would be used if the ring were to be pressed in a cured or cast resilient body.

As seen in FIG. 3, the ends 4 and 5 of the compression joint in the outer ring 2 have an offset portion 7 in the circumferential groove 6. This offset portion acts as an interlocking means to prevent misalignment of the ends 4 and 5 and, moreover, permits a certain degree of lateral flexure in the outer ring 2.

In making the mounting ring, the rubber annulus 3 is accurately molded with equally spaced arcuate openings 8, preferably three in number. As seen in FIG. 2, these openings are formed in one face of the ring and extend to a depth slightly less than the transverse thickness of the annular ring 3, thereby forming a thin integral closure wall or web 9 in the other face of the annulus 3. These walls serve as guards for the openings 8 against the entrance of dirt from the outside and also serve to afford a neater or more conventional outside appearance. However, in some applications, these closure walls are not absolutely essential and may be omitted if desired.

To provide an electrical bond between the rings 1 and 2 a "pigtail" 10, which is a woven strap-type electrical cable, is welded or otherwise suitably secured to the edges of the rings 1 and 2. The ends of the cable are preferably welded to the edges of the rings 1 and 2 as shown at 11 in FIG. 2, the intermediate portion of the cable being flexed or folded in a U-shaped bend, the bight portion of which is recessed well within an opening 8. This recessing of the "pigtail" protects it from being torn loose inadvertently and also the U-shaped bend permits flexure when the rings 1 and 2 move relatively to each other. It is, of course, understood that the cable 10 may be made of any suitable electrically conductive material. For most applications copper is preferred. Also, brazing may be used in place of welding, if desired.

In manufacturing the mounting ring, rings 1 and 2 are placed in a suitable mold and the rubber or other appropriate resiliently deformable material is intruded therein in a suitable liquid or plastic state. When the rubber or the like has been cured, the ring is removed from the mold. This molding operation firmly bonds the body 3 to the metallic rings 1 and 2. However, since the molding process results in a thin layer of rubber extending over the edges of the rings 1 and 2, as shown at 12 in FIG. 2, this layer must be removed before an effective electrical bond may be made to the edges of the rings. We have found that the quickest and most effective method of removing this thin layer of rubber is by grinding. The grinding operation not only removes the unwanted rubber layer from a local region but effectively cleans the edges of the rings thereby insuring a firm and complete bond between the cable 10 and the rings 1 and 2. The grinding operation may cover the entire face of the mounting ring to provide a neater appearance to the ring or the grinding operation may be restricted to the area of the electrical cable attachment.

Thus, it will be seen that we have provided a motor mounting that will not only effectively dampen the vibrations of the motor as well as the external forces exerted thereon but will also afford a permanent electrical ground for the motor without danger of early failure in use.

Other modes of applying the principle of the invention may be employed, change being made as regards the details described, provided the features stated in any of the following claims or the equivalent of such be employed.

We therefore particularly point out and distinctly claim as our invention:

A mounting ring for motors or the like comprising concentrically spaced inner and outer annular metallic bands, a body of resilient vibration dampening material disposed between said inner and outer bands and firmly bonded thereto, said body having circumferentially spaced arcuate openings in a face thereof, and a woven strap-type electrical cable having its ends in contact solely with and firmly weld-connected and thus electrically bonded to edges of said metallic bands clear of the outer side of said outer band and clear of the inner side of said inner band, said cable being flexible in direction both radially and circumferentially of said bands and flexed and folded to lie substantially within one of said openings.

References Cited in the file of this patent

UNITED STATES PATENTS

| | | |
|---|---|---|
| 1,746,650 | Harrington | Feb. 11, 1930 |
| 1,833,756 | Perazzoli | Nov. 24, 1931 |
| 1,854,328 | Binder | Apr. 19, 1932 |
| 1,967,340 | Van Splunter | July 24, 1934 |
| 2,068,639 | Alsaker et al. | Jan. 26, 1937 |
| 2,450,974 | Mallina | Oct. 12, 1948 |
| 2,701,411 | Paine | Feb. 8, 1955 |
| 2,729,846 | Reed | Jan. 10, 1956 |
| 2,740,073 | Wightman | Mar. 27, 1956 |
| 2,945,988 | Henry et al. | July 19, 1960 |